April 13, 1965     J. R. BORDEN     3,178,624
STATIC SPEED CONTROL SYSTEM FOR ELECTRIC MOTORS
Filed May 31, 1961     2 Sheets-Sheet 1
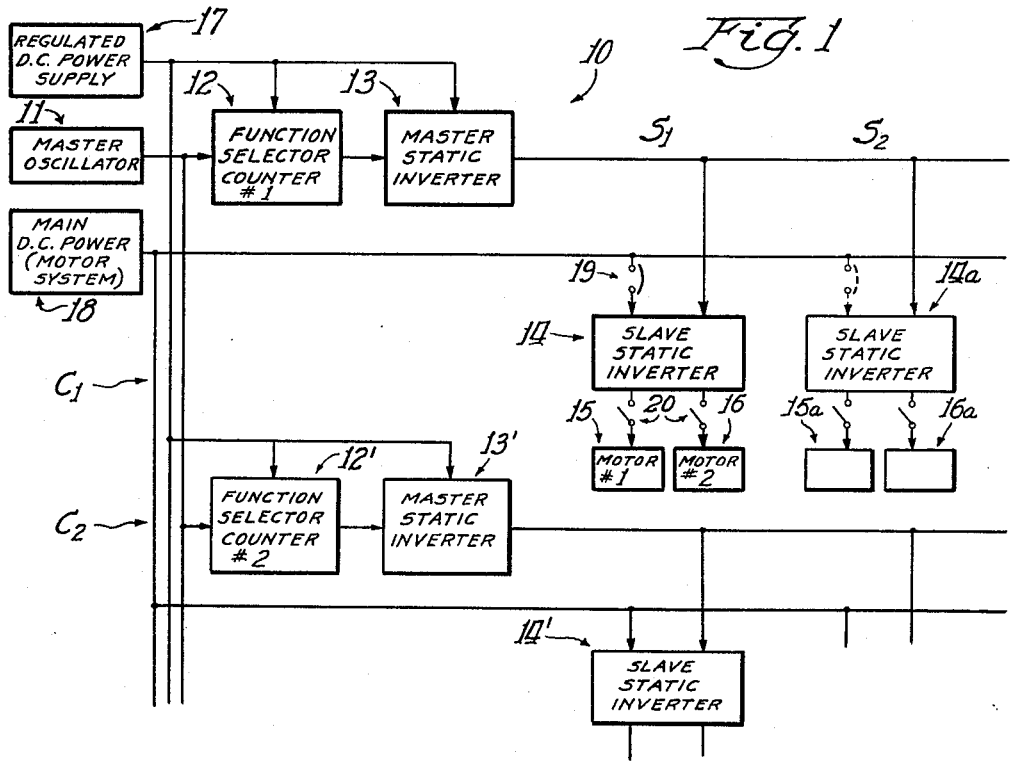
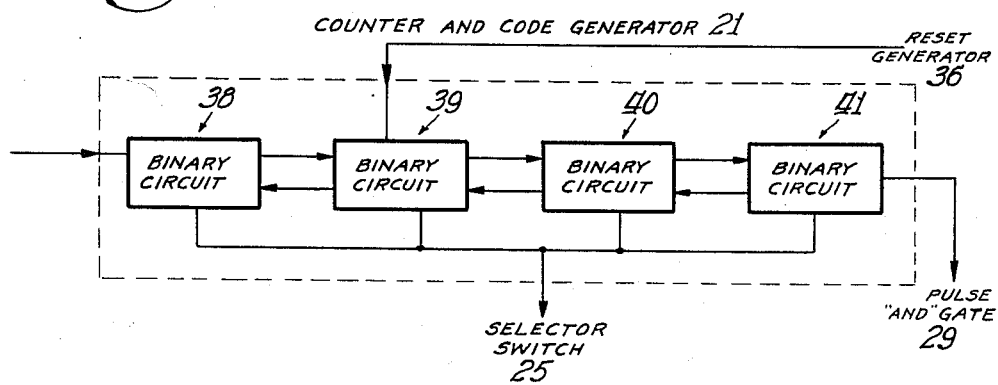
Inventor:
Jay R. Borden
By: Ray E. Snyder
atty.

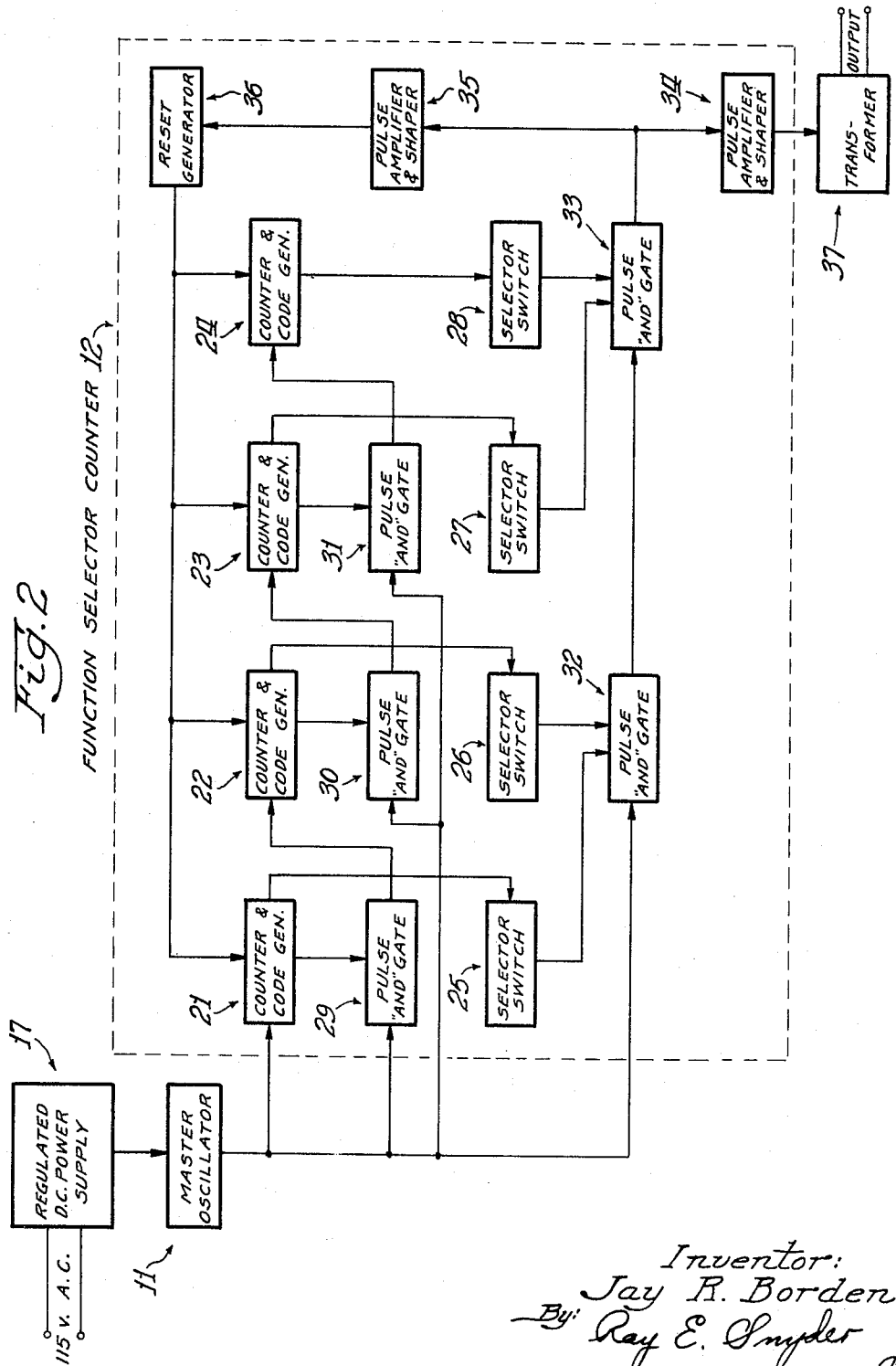

United States Patent Office 3,178,624
Patented Apr. 13, 1965

3,178,624
STATIC SPEED CONTROL SYSTEM FOR ELECTRIC MOTORS
Jay R. Borden, La Canada, Calif., assignor to Borg-Warner Corporation, Chicago, Ill., a corporation of Illinois
Filed May 31, 1961, Ser. No. 113,827
8 Claims. (Cl. 318—67)

This invention relates to a static motor control system adapted to control the speed of a plurality of electric motors.

In many industrial processes such as making paper, winding coils, or spinning textile fibers it is necessary to control precisely the speed at which the various steps in the particular process are performed. In addition, for mass production techniques, it is necessary to duplicate the particular process at a plurality of stations. It is essential that the speed at which all steps of the process are performed, as well as the speed at the various stations, be precisely synchronized and controlled.

It is an object of the present invention to provide a static motor control system for controlling a plurality of synchronous electric motors at different speeds which are precisely locked together at an integral ratio reference.

It is a more particular object to provide a static motor control system including a plurality of synchronous electrical motors, a source of D.-C. power, a plurality of static inverters for converting the D.-C. voltage into an alternating voltage, a function selector counter for controlling the frequency of the operation of static inverters, and a master oscillator for providing a clock frequency for operating the function selector counters, the counters being adjustable to operate at a predetermined sub-multiple frequency of the master oscillator frequency for thereby controlling the speed of rotation of the electrical motors.

It is a still more particular object to provide a static motor control system comprising a matrix of a plurality of function channels and a plurality of stations interconnected with each channel and all locked together at an integral ratio with respect to a master oscillator, a master static inverter driven by the function counter, a plurality of slave static inverters driven by the master inverter, and one or more electric motors connected to each slave static inverter. Each station comprises a slave static inverter and one or more electrical motors connected to each function channel. The function selector counters are connected to the master oscillator and are adjustable to operate at a sub-multiple of the master oscillator frequency for operating all of the slave static inverters in that particular channel at the selected frequency, and each station operates overall at precisely the same speed as every other station.

The invention consists of the novel constructions, arrangements and devices to be hereinafter described and claimed for carrying out the above-stated objects and such other objects as will appear from the following description of preferred embodiments of the invention, illustrated with reference to the accompanying drawings, wherein:

FIGURE 1 is a block diagram of the motor control system of the present invention;

FIGURE 2 is a block diagram of the function selector counter of FIGURE 1; and

FIGURE 3 is a block diagram of a counter and code generator shown in FIGURE 2.

Referring to FIGURE 1, the motor control system is designated generally by the numeral 10 and comprises a plurality of electrical function channels designated as $C_1$, $C_2$, etc. All of the electrical channels are connected to a master oscillator or pulse generator 11 which provides a clock pulse frequency for operating the control system 10. The electrical function channel $C_1$ comprises a function selecter counter 12, a master static inverter 13, a plurality of slave static inverters 14, 14a, etc. and a plurality of synchronous electric motors 15 and 16, 15a and 16a, etc. The selector counter 12 and master static inverter 13 are energized from a regulated D.-C. power supply 17, and the slave static inverters 14, 14a are energized from a main D.-C. power supply 18. The electrical channel $C_1$ may include any desired or feasible number of static inverters 14 and motors 15 and 16 connected in parallel to the master static inverter 13 and to the main D.-C. power supply 18.

The electrical function channel $C_2$ comprises a function selector counter 12', and master static inverter 13', and slave static inverters 14', etc. The channel $C_2$ is substantially identical to the channel $C_1$ and is connected in parallel with it to the master oscillator 11 and regulated D.-C. power supply 17 and main D.-C. power supply 18. The control system 10 may include as many electrical channels as desired or as are necessary to perform all the steps of the particular process. Each station performs a complete process and as many stations may be included as are desired or economically feasible.

A circuit breaker 19 may be provided in the power line between each slave static inverter 14 and the main power supply 18, and a switch 20 may be provided for each of the motors 15 and 16.

The master oscillator 11 provides a timing signal which may be in the form of a series of pulses recurring at a relatively high frequency of, for example, 250 kilocycles to 1 megacycle. The master oscillator signal is fed to each of the function selector counters 12, 12', which are preset to count some predetermined sub-multiple number of pulses for operating the master static inverter 13 at a frequency of, for example, 25 to 200 cycles per second. The output signal of the master static inverter 13 is in the form of a square wave of the same frequency as supplied by the function selector counter 12 and operates each slave static inverter 14 at this frequency. The slave static inverters 14 in effect turn the D.-C. power supplied from the source 18 on and off at this function frequency for driving the motors 15 and 16 at that frequency. All of the motors in the particular channel are therefore driven at the speed set by the function selector counters 12, 12', etc.

The function selector counter 12' is presumably set to count some different frequency and drives the master static inverter 13' and slave static inverters 14' at this latter frequency.

Each of the function channels therefore is set to operate at some preselected frequency which is a sub-multiple of the master oscillator frequency. The function selector counters 12, 12' for each channel determine the speed of operation of the electrical motors in each channel and all of the counters are synchronized by the master oscillator 11, so that the motors at each station thereby are electrically locked to operate at the same speed as corresponding motors at every other station.

Referring to FIGURE 2, the function selector counter 12 of FIGURE 1 is shown in block diagram form and comprises four decade counters or code generators 21, 22, 23 and 24, four selector switches 25, 26, 27 and 28, five pulse "and" gates 29, 30, 31, 32 and 33, two pulse amplifiers and shapers 34 and 35, and a reset generator 36. The master oscillator 11 is connected directly to the input of the counter 21 and to the inputs of the pulse "and" gates 29, 30, 31 and 32.

One output of each of the counters 21–24 is connected to a selector switch 25–28 respectively. Another output of each of the counters 21–23 is connected to an input of the pulse "and" gates 29–31 respectively. The outputs of the selector switches 25 and 26 are connected to respective inputs of the pulse "and" gate 32; and the outputs of the selector switches 27 and 28 and pulse "and" gate 32 are connected to respective inputs of the pulse "and" gate 33. The output of the pulse "and" gate 33 is connected through the pulse amplifier and shaper 34 to a transformer 37 which in turn is connected to the master static inverter 13. The output of the pulse "and" gate 33 is also connected through the pulse amplifier and shaper 35 to an input of the reset generator 36. The output of the reset generator 36 is connected to each of the counters 21–24 for resetting them to their initial condition. The reset process requires a finite time, in terms of the pulse output of the master oscillator 11, and this time loss is taken into consideration in resetting the counter 21.

Referring to FIGURE 3, the counter and code generator 21 is shown in block diagram form and comprises four binary circuits 38, 39, 40 and 41. The binary circuits 38–41 may be bistable devices well known in the art, and feedback connections are provided so that overall, the counter counts by 10's at its final output.

Such devices are well known in the art and their description is not deemed necessary for an understanding of the invention.

The selector switch 25 is interconnected with the binary circuits at appropriate points so that any decimal number of counts from 1 to 10 can be selected by the switch 25. The output of the reset generator 36 is interconnected with one of the binary circuits 38–41 at an appropriate point so as to precount the pulses lost in the the reset process. The number of pulses lost in the reset process is a function of the master oscillator frequency and the time delay in the reset circuit. This number of pulses may be determined experimentally.

In operation, the master oscillator 11 delivers a pulse output of a relatively high frequency, e.g., 250 kc. to 1 mc. These pulses are fed to one input of each of the "and" gates 29–32 and to the input of the counter and code generator 21. Each of the selector switches 25–28 are preset to count a given number of pulses. The first selector switch 25 is set to count the digit pulses from 1–9; the selector switch 26 counts the tens digit from 10–90; the selector switch 27 counts the hundred digits from 100 to 900 and the selector switch 28 counts the thousand digits from 1,000 to 9,000. The selector switches 25–28 therefore can be preset to provide one output pulse for any number of input pulses from 1 to 10,000.

The final output of the counter 21 is connected to one input of the "and" gate 29, and when the next succeeding pulse from the master oscillator 11 is provided to the other input of the "and" gate 29, an output pulse is provided to the input of the counter 22. The counter 22 therefore receives one pulse for every ten pulses provided to the counter 21. The selector switch 25 however is interconnected with all the binary circuits 38–41 to select any number of pulses from 1–9. Similarly, the final output of the counter 22 is connected to one input of the pulse "and" gate 30 and the next succeeding pulse from the master oscillator 11 provides an output pulse which is applied to the input of the counter 23. The counter 23 therefore receives one pulse for every 100 pulses supplied by the master oscillator 11. Similarly, the counter 24 receives one pulse for every 1,000 received from the master oscillator 11.

When the preselected count set by the switches 25–28 has been obtained, the next succeeding pulse from the master oscillator 11 is transmitted through the gates 32 and 33 to the pulse amplifiers 34 and 35. The output of the pulse amplifier 34 is fed through the transformer 37 for driving the master static inverter 13. The recurring pulse input to the master static inverter 13 is effective to convert the D.-C. voltage from the power supply 17 into a square wave A.-C. voltage for driving the slave static inverters 14. The master static inverter 13 for this purpose may be of the type described in the patent to Edward M. Schmidt, 2,953,735. The square wave frequency for driving the slave static inverters 14 in turn determines the speed of operation of the motors 15 and 16.

The output of the pulse "and" gate 33 is also fed through the pulse amplifier 35 to the reset generator 36. The reset generator 36 feeds a pulse to each of the counters 21–24 for resetting them to their initial condition. The function selector counter 12 then begins again to count the preset number of pulses from the master oscillator 11 so as to provide another output pulse to the transformer 37.

The function selector counters 12, 12', etc. are preset to count the number of pulses desired for driving all the electric motors in the particular channels C–1, C–2, etc. respectively. The speed of all of the motors in the system is thereby precisely controlled from a single master oscillator source.

There has been provided by this invention an improved static motor control system adapted to control a plurality of electric motors at different speeds for performing a particular process, and the process may be duplicated at any desired or feasible number of stations.

It is to be understood that the invention is not to be limited to the specific constructions and arrangements shown and described, except only insofar as the claims may be so limited, as it will be understood to those skilled in the art that changes may be made without departing from the principles of the invention.

I claim:
1. In a control system for regulating the speeds of a plurality of electric motors, the combination of:
   a plurality of slave inverters, each of which is coupled to a least one of said motors;
   means for applying D.-C. energy to each of said slave inverters;
   a master inverter coupled to each of the slave inverters for driving each slave inverter at a frequency related to the operating frequency of the master inverter;
   a function selector counter having an input connection for receiving a series of timing signals, and an output connection for issuing a single control signal responsive to receipt of a group of timing signals totalling a predetermined number, the output connection being coupled to the master inverter to regulate the frequency of operation of the master inverter, and thus of each slave inverter, in relation to the frequency of the control signals provided by the function selector counter; and
   means for applying a series of timing signals to the input connection of the function selector counter.

2. In a control system for regulating the speeds of a plurality of electric motors, the combination of:
   a plurality of slave inverters, each of which is coupled to a least one of said motors;
   means for applying D.-C. energy to each of said slave inverters;
   a master inverter coupled to each of the slave inverters for driving each slave inverter at a frequency related to the operating frequency of the master inverter;
   a function selector counter having an input connection for receiving a series of timing signals, and an output connection for issuing a single control signal responsive to receipt of a group of timing signals totalling a predetermined number, the output connection being coupled to the master inverter to regulate the frequency of operation of the master inverter, and thus of each slave inverter, in relation to the frequency of the control signals provided by the function selector counter;
   means for applying regulated D.-C. energy to the function selector counter and to the master inverter; and
   means for applying a series of timing signals to the input connection of the function selector counter.

3. In a control system for regulating the speeds of a plurality of electric motors, the combination of:
- a plurality of inverters, each of which is coupled to at least one of said motors;
- means for applying D.-C. energy to each of said inverters;
- a function selector counter having an input connection for receiving a series of timing signals, an output connection, and adjusting means for determining the number of timing signals which must be received prior to providing a single control signal at the output connection, the output connection being coupled to each of the inverters to regulate the frequency of operation of each inverter in relation to the frequency of the control signals provided by the function selector counter; and
- means for applying a series of timing signals to the input connection of the function selector counter.

4. In a motor control system for regulating the speeds of a plurality of electric motors, certain of which motors are to be operated at speeds which differ from the operating speeds of others of the motors, the combination of:
- a first electrical channel, including a first inverter coupled to one of the motors, a first function selector counter operable to issue a single output control pulse responsive to receipt of a predetermined number of input timing pulses, and means for applying the output control pulse to the first inverter to regulate the frequency of operation of the first inverter and thereby regulate the speed of said one motor;
- a second electrical channel, including a second inverter coupled to a second one of the motors, a second function selector counter operable to issue a single output control pulse responsive to receipt of a predetermined number of input timing pulses, and means for applying the output control pulse from the second function selector counter to the second inverter to regulate the frequency of operation of the second inverter and thereby regulate the speed of the second motor; and
- means for applying the same input timing pulses to both the first and second function selector counters, thus providing a common reference for the different motor speeds.

5. In a motor control system for regulating the speeds of a plurality of electric motors, certain of which motors are to be operated at speeds which differ from the operating speeds of others of the motors, the combination of:
- a first electrical channel, including a first inverter coupled to a first plurality of the motors, a first function selector counter operable to issue a single output control pulse responsive to receipt of a predetermined number of input timing pulses, and means for applying the output control pulse to the first inverter to regulate the frequency of operation of the first inverter and thereby regulate the speed of the first plurality of motors;
- a second electrical channel, including a second inverter coupled to a second plurality of the motors, a second function selector counter operable to issue a single output control pulse responsive to receipt of a predetermined number of input timing pulses, and means for applying the output control pulse from the second function selector counter to the second inverter to regulate the frequency of operation of the second inverter and thereby regulate the speed of the second plurality of motors; and
- means for applying the same input timing pulses to both the first and second function selector counters, thus providing a common reference for the different speeds of the first plurality of motors and the second plurality of motors.

6. In a motor control system for regulating the speeds of a plurality of electric motors, certain of which motors are to be operated at speeds which differ from the operating speeds of other of the motors, the combination of:
- a first electrical channel, including a first inverter coupled to one of the motors, a first function selector counter operable to issue a single output control pulse responsive to receipt of a predetermined number of input timing pulses, first adjusting means connected in the first function selector counter to set the number of input timing pulses which must be received prior to issuing a single output control pulse, and means for applying the output control pulse to the first inverter to regulate the frequency of operation of the first inverter and thereby regulate the speed of said one motor;
- a second electrical channel, including a second inverter coupled to a second one of the motors, a second function selector counter operable to issue a single output control pulse responsive to receipt of a predetermined number of input timing pulses, second adjusting means connected in the second function selector counter to set the number of input timing pulses which must be received prior to issuing a single output control pulse, and means for applying the output control pulse from the second function selector counter to the second inverter to regulate the frequency of operation of the second inverter and thereby regulate the speed of the second motor; and
- means for applying the same input timing pulses to both the first and second function selector counters, thus providing a common reference for the different motor speeds as determined by the settings of the first and second adjusting means in their respective first and second function selector counters.

7. In a motor control system for regulating the speeds of a plurality of electric motors, certain of which motors are to be operated at speeds which differ from the operating speeds of others of the motors, the combination of:
- a first electrical channel, including a first plurality of slave inverters respectively coupled to a first plurality of the motors, a first master inverter connected to regulate the operating frequencies of all of the first plurality of slave inverters, a first function selector counter operable to issue a single output control pulse responsive to receipt of a predetermined number of input timing pulses, and means for applying the output control pulse to the first master inverter to regulate the frequencies of operation of the first plurality of slave inverters and thereby regulate the speeds of the first plurality of motors;
- a second electrical channel, including a second plurality of slave inverters respectively coupled to a second plurality of the motors, a second master inverter connected to regulate the operating frequencies of all of the second plurality of slave inverters, a second function selector counter operable to issue a single output control pulse responsive to receipt of a predetermined number of input timing pulses, and means for applying the output control pulse from the second function selector counter to the second master inverter to regulate the frequencies of operation of the second plurality of slave inverters and thereby regulate the speeds of the second plurality of motors; and
- means for applying the same input timing pulses to both the first and second function selector counters, thus providing a common reference for the different motor speeds in the first and second electrical channels.

8. In a motor control system for regulating the speeds of a plurality of electric motors, certain of which motors are to be operated at speeds which differ from the operating speeds of others of the motors, the combination of:

a first electrical channel, including a first plurality of slave inverters respectively coupled to a first plurality of the motors, a first master inverter connected to regulate the operating frequencies of all of the first plurality of slave inverters, a first function selector counter operable to issue a single output control pulse responsive to receipt of a predetermined number of input timing pulses, and means for applying the output control pulse to the first master inverter to regulate the frequencies of operation of the first plurality of slave inverters and thereby regulate the speeds of the first plurality of motors;

a second electrical channel, including a second plurality of slave inverters respectively coupled to a second plurality of the motors, a second master inverter connected to regulate the operating frequencies of all of the second plurality of slave inverters, a second function selector counter operable to issue a single output control pulse responsive to receipt of a predetermined number of input timing pulses, and means for applying the output control pulse from the second function selector counter to the second master inverter to regulate the frequencies of operation of the second plurality of slave inverters and thereby regulate the speeds of the second plurality of motors;

a first energizing means for applying D.-C. energy to all of said slave inverters;

second energizing means for applying regulated D.-C. energy to all the function selector counters and to all the master inverters; and means for applying the same input timing pulses to both the first and second function selector counters, thus providing a common reference for the different motor speeds in the first and second electrical channels.

References Cited by the Examiner

UNITED STATES PATENTS

| | | | |
|---|---|---|---|
| 2,623,203 | 12/52 | Demuth | 321—5 |
| 2,791,734 | 5/57 | Kieffert | 318—329 |
| 2,879,460 | 3/59 | Crawford et al. | 318—67 |
| 2,916,687 | 12/59 | Cronin | 321—5 |
| 2,953,735 | 9/60 | Schmidt | 321—5 |
| 3,052,833 | 9/62 | Coolidge | 321—5 |
| 3,074,000 | 1/63 | Salihi | 321—45 X |

OTHER REFERENCES

"Power Transistor Handbook," 1st ed., Motorola, 1960, Chap. 4, pages 101–134.

JOHN F. COUCH, *Primary Examiner.*

ORIS L. RADER, *Examiner.*